US006460021B1

(12) United States Patent
Kirksey

(10) Patent No.: US 6,460,021 B1
(45) Date of Patent: Oct. 1, 2002

(54) COLLATERALLY SECURED DEBT OBLIGATION AND METHOD OF CREATING SAME

(76) Inventor: William E. Kirksey, 135 W. 20th St., New York, NY (US) 10011

( * ) Notice: Subject to any disclaimer, the term of this patent is extended or adjusted under 35 U.S.C. 154(b) by 0 days.

(21) Appl. No.: 09/438,433

(22) Filed: Nov. 12, 1999

Related U.S. Application Data

(63) Continuation-in-part of application No. 08/847,854, filed on Apr. 28, 1997, now abandoned, which is a continuation of application No. 08/660,713, filed on Jun. 10, 1996, now abandoned, which is a continuation of application No. 08/128,455, filed on Sep. 28, 1993, now abandoned.

(51) Int. Cl.[7] .............................................. G06F 17/60
(52) U.S. Cl. ........................................... 705/35; 705/1
(58) Field of Search ............................... 705/1, 35, 500

(56) References Cited

U.S. PATENT DOCUMENTS

| 4,524,903 A | 6/1985 | Vath ............................. 229/73 |
| 4,742,457 A | 5/1988 | Leon et al. .................. 364/408 |
| 4,876,648 A | 10/1989 | Lloyd ........................... 364/408 |
| 5,083,270 A | 1/1992 | Gross et al. ................. 364/408 |
| 5,206,803 A | 4/1993 | Vitagliano et al. .......... 364/408 |
| 5,237,500 A | 8/1993 | Perg et al. ................... 364/408 |
| 5,323,315 A | 6/1994 | Highbloom .................. 364/408 |
| 5,563,783 A | * 10/1996 | Stolfo et al. ..................... 705/8 |
| 5,852,811 A | * 12/1998 | Atkins .......................... 705/36 |

FOREIGN PATENT DOCUMENTS

| WO | WO 95/27945 | * 10/1995 |

OTHER PUBLICATIONS

"Mail Asset Realty Trust Commercial Mortgage P–Ts 1999–1 Rated by Fitch ICBA–Fitch ICBA–"; PR Newswire, Mar. 25, 1999, p. 1996.*

Mitchell, "Investors Snap Up Co–op Bond Offer At 7.32% to 8.15%", Jul. 10, 1992, Wall Street Journal.

Holloway and Wallick, "A Risk Worth Taking", 1992, Scientific American, p. 126.

Bacon. "Clinton Looks to a Bark in Bangladesh For Model to Help U.S. Poor Get Loans", Aug. 27, 1993, Wall Street Journal.

Passell, "High–Rise Co–ops for Bargain–Basement Prices", Nov. 30, 1993, New York Times, B1 and B4 O'Brien, "Tribes Use Loans to Small Businesses to Create Jobs", undated.

* cited by examiner

*Primary Examiner*—Edward R. Cosimano
(74) *Attorney, Agent, or Firm*—Pennie & Edmonds LLP

(57) ABSTRACT

A debt obligation issued to a holder by an entity which obligation is backed by a group of property owners, each owning an individual property, where the entity obtains from each owner cross-collateralized lien and loan agreements in which the owners promise to pay his or her periodic payments to the entity and to pay, if defaults occur, each and every other owner's periodic payments. The method of creating and servicing such obligation includes use of calculating equipment. The system includes pre-organization effort to assemble a peer lending group of potential property owners and causing the entity to purchase the homes at a below-market price using temporary financing which is later consolidated in bond financing.

21 Claims, 8 Drawing Sheets

COLLATERALLY SECURED DEBT OBLIGATION AND METHOD OF CREATING SAME

RELATED APPLICATIONS

This application is a continuation-in-part of U.S. application Ser. No. 08/847,854 filed Apr. 28, 1997, entitled "Collaterally Secured Debt Obligation An Method Of Creating Same" now abandoned, which in a continuation of U.S. application Ser. No. 08/660,713 filed Jun. 10, 1996, entitled "Collaterally Secured Debt Obligation An Method Of Creating Same" now abandoned, which in a continuation of U.S. application Ser. No. 08/128,455 filed Sep. 28, 1993, entitled "Collaterally Secured Debt Obligation An Method Of Creating Same" now abandoned.

BACKGROUND OF THE INVENTION

Cooperative apartment buildings or cooperatively owned clusters of homes have operated with the building or cluster being owned by a single entity and with the occupants owning proportional stock interests in the single entity. Occupants of such cooperative apartments or homes have borrowed monies using their resalable interests in stock in the single entity as collateral. Such single entities have borrowed monies against such building or cluster ownership through mortgage loans that were subsequently packaged as guaranty for "derivative" mortgage backed securities.

Single family homes are traditionally sold one at a time at fair market value, whether as resales by owners or new sales by developers or builders. Mortgage loan lending sources, such as banks and other mortgage loan providers, lend against the fair market, retail appraised value of the home. The fact that lenders lend against the retail value of homes is indirect proof that no wholesale market exists in single family homes.

Credit insurance has traditionally been available to home owners as a policy specifically written to cover individual mortgage loans and not treated as casualty insurance. Such insurance has increased the willingness of lenders to make loans in certain circumstances.

Where home owners have sufficient equity in excess of any mortgage loan balance, home owners have been able to obtain home equity loans the proceeds of which may be used for purposes unrelated to the home, such as starting a business.

In some jurisdictions such as the United States, homeowners have an absolute right to prepay home loans without penalty. This may result in unexpected liquefying of bonds.

SUMMARY OF THE INVENTION

The present invention comprises a method of creating and selling marketable collateral backed debt instruments comprising creating a debt-instrument-issuing-entity which lends mortgage or other lien-backed monies to a group of property owners each owning his or her property in a fee simple or other mortgageable or transferable interest in property against which a lien may be placed. Each property owner retains his title or other interest pending a default of the entity. This invention contemplates the entity obtaining cross-collateralized mortgage or lien agreements from each of such property owners promising to pay his or her secured loan interest and debt and; in addition, such debt of each and every other property owner limited to the value of his or her equity, if any, remaining in his or her subject property.

The entity issuing or facilitating the issuing of the debt instrument may promise to honor the instrument obligations or may consolidate or pool the promises of others, such as a group of property owners, to honor the instrument obligations or the entity may do both. Whether the entity promises to honor the obligations of the debt instrument or not, the entity obtains from the group of property owners each and every owner's guaranty that he or she a) will pay the instrument's principal and interest or sums at least equal thereto; or b) agree to be jointly and severally liable with all other owners in the group to pay such principal and interest.

The guarantees from each and every owner in the group are collateralized by the lien, mortgage, or other hypothecation of each property. Each debt instrument is thus collaterally and jointly and severally guaranteed by such owners. Such collaterally guaranteed instruments provide substantial security to the debt instrument holder even where reasonable limits are placed on the total obligations of each owner such as limiting the owner's liability for the debt of others to the equity in his own home.

Further, the invention contemplates that to strengthen the debt instrument's credit the entity may obtain property lien and loan cross collateralizing agreements from such property owners in which the owner promises to pay his or her group (or common) charges and those of each and every other owner in the group, as defined and declared by the debt-instrument-entity. The property owners are jointly and severally liable for each others obligations to such entity. The entity then issues debt instruments, such as notes and bonds, which are backed by mortgages or liens and cross-collateralizing agreements. Personal liability of each property owner for the share of group (or common) charges above the amount associated with his or her own property may be limited to his or her equity in said property.

The present invention facilitates each and every member of a group of property owners in obtaining credit through the placing of mortgages or other liens upon group members properties to back bonds issued by a financing entity. Each bond is backed by all or a plurality of properties in the group.

It is a feature of the invention that, since each and every participating property owner places his or her property at risk to be sold to guarantee the performance of each and every member of the group with respect to debt instruments (i.e. notes or bonds) being issued by the entity, such debt instruments have higher or enhanced credit ratings and will be marketable at reasonable yield rates. Each individual loan is collateralized by the mortgage or other lien on the property of the individual signing the loan and further each loan is cross-collateralized in that additional mortgages or other liens from group members further secure repayment of such loan.

It is also a feature of the invention that when prepayment of a loan is made by one or more of the group of property owners, in cases where such prepayment is allowed as in real property mortgages, the interest income flow to debt instrument holders is protected by the other property owners through their commitment to adjust their periodic payments to the entity to cover any short-fall due to any inability of the entity to reinvest the prepaid principal at a yield rate equal to or higher than that promised such holders. Liability under this feature is limited to the equity in each homeowner's subject property.

It is also a feature of the invention that the group of property owners have a commonality created by their participation in the group and which may include physical proximity, ownership of shares in the entity and participation in common facilities and social programs which may or may not be owned and or administered by the debt-instrument-Entity.

An additional feature of the invention is that the organizing entity may enter into cross-collateralization agreements with other such entities so as to create a reinsurance pool, an Entity of entities. In such case no individual property owner liability shall extend beyond the equity in his or her property.

Another feature of the invention is that the number of participants in each entity be small enough so as to facilitate a community of members who can be well acquainted with one another while at the same time large enough to assure adequate spreading of risk from an actuarial standpoint. It has been determined that this number is at present approximately three hundred property owners. Whatever this number is, the membership total in an entity shall attempt to approximate it. Acquaintanceship of neighbors has been shown to foster a sense of well being in a community and a desire of property owners to properly service home debt obligations; it has also been shown that risk pools large enough to absorb individual negative experiences without major disruption will qualify for lower insurance rates or higher credit ratings.

An additional feature of this invention is the potential for credit insurance as an aspect of an overall casualty insurance agreement obtained by the entity in behalf of the property owners. The cross-collateralization within the entity renders a credit default a group casualty rather than an individual incident. For this reason, casualty insurers may be induced to include credit insurance as indistinguishable from fire or other casualty insurance that may be offered the entity or its property owners. Generally, credit insurance is based significantly on "moral" risk where underwriting criteria include past installment debt payment practices often unrelated to housing or rent. The present invention will permit a first layer of credit risk to be absorbed internally by the Entity using reserves or assessments, thus requiring only a second layer of risk to be covered commercially. The second layer of risk may be limited to a situation in which, for example, 10% or more of the homeowners are simultaneously in default. This is extremely unlikely and the events that might bring such a situation about have more in common with casualty risks than general credit risks. Therefore, property and casualty risk underwriters, as opposed to credit risk underwriters, will have the expertise to underwrite such credit risks, a feature made possible by the present invention. Consolidating credit insurance with fire insurance will create underwriting efficiencies and enhance overall credit worthiness of the Entity, thus reducing interest costs.

It is also a feature of this invention that the property owners may be organized into an entity in advance so as to obtain, in advance of home purchase, a funding commitment from a permanent lender or bond underwriter or bond purchaser. This advance commitment will secure bridge borrowing such that a mass purchase by the entity of a quantity of homes may result in a substantial discount in acquisition cost. The mass purchase creates a wholesale purchase at a wholesale price. This discount shall inure to each homeowner as "fiscal sweat equity" and may obviate the need for down payments to satisfy the equity requirements of lenders. Traditionally, "sweat equity" is earned by homeowner candidates by providing manual labor to improve a candidate property and thereby earn a portion of its value or purchase price; under the present invention "sweat equity" is earned by the homeowner by agreeing to join with others in a group, wholesale purchase, below the independent appraised retail value. Homes offered individually for resale later may be priced at full retail value which will include both the spread between retail and wholesale at the time of original purchase plus any subsequent appreciation.

It is another feature of the invention that the Entity identifies homeowner group candidates, approves the candidates for participation, collects their monthly payments, and enforces the individual obligations; this effectively permits the borrower to perform as "in kind" services the marketing, credit approval, servicing, and enforcement functions that ordinarily increase lender costs; accordingly, lower interest rates are possible while still providing lenders with the same level of return on capital. Lower interest rates have the effect of increasing the probability of performance and therefore enhance borrower creditworthiness.

It is a further feature of this invention that equity obtained through purchase discount or other means may enable the sale of bonds or other forms of permanent financing instruments in an amount exceeding the aggregate cost of the entity property owners' property while not exceeding the aggregate fair market value of the aggregate property. By this method, the entity may obtain funds which will be available for income earning endeavors such as the operation of small businesses or the acquisition of commercial real estate. Since the cost of such overage funds will be covered in the monthly property owner payments, these funds may also be available to be leveraged for additional finding from government agencies such as, in the U.S., the Small Business Administration.

It is also a feature of this invention that an international secondary market may be created to trade the entity bonds, which market will be made viable through the cross-collateralized structure of multiple entities. The cross-collateralized structure of the multiple entities will diminish fears of political risk and may attract political insurance from international organizations such as the World Bank or the U.N. The liquidity provided by such a market will further reduce the cost of funds thereby improving the ability to pay of property owners and enhancing the strength of the overall inventive strategy. Such a market may be Internet based due to its international nature.

Another feature of the invention made possible by the cross-collateralization of multiple entities will be the exchange of information relating to the success of small businesses or other ventures. The Entity of entities shall act as a clearing house of ideas and information including home construction and building technology and an inventory of business models suitable for such entities (using finds not earmarked for homes) to start and operate. Such ideas and information will therefore inure to the benefit of all of the entities.

It is a final feature of the invention that the portfolio of bonds securitizing the homeowner debt may consist of individual bonds maturing at staggered rates of time such that the average maturity of all the bonds approximates the average holding period of comparable homes; the maturities are staggered such that the Entity is refinancing or rolling over portions of its debts either annually or semi-annually. The continual act of refinancing permits the entity to absorb cash from any prepayments of homeowner debt for any reason, the most likely of which is the sale of the home to another party who chooses not to use Entity financing. The effect is that excess cash which may not be invested at rates sufficient to cover promised yields to bondholders will not be on hand for more than six months if that is the rollover frequency of the Entity. Any deficits created by reinvestment negative spreads will be small enough to be absorbed as ordinary expense of the Entity. This feature will enable the Equity to offer bond buyers instruments protected from prepayment risk and thereby obtain reductions in borrowing costs.

DESCRIPTION OF THE PREFERRED EMBODIMENT

Figure 1:
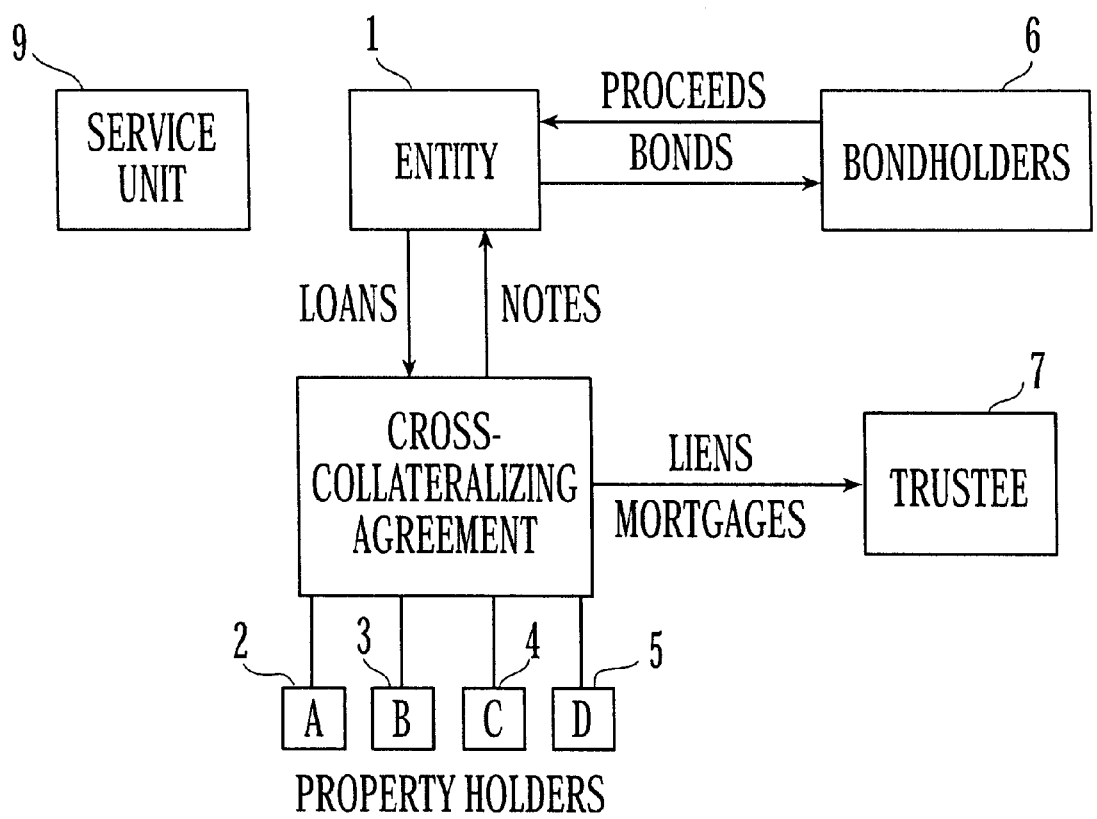
FIG. 1 is a block diagram showing the relationship and interfunctioning of the entities, persons and units of this invention.

The debt-instrument-issuing-entity (herein the "Entity") issues a series of bonds purchased by bondholders (FIG. 1). The bonds have staggered maturity dates and are backed by the fee simple or other property titles of a group of property home owners. Each bond is backed by title to each and every title in the properties in a group of properties at the time of issuance. If any individual homeowner mortgage loan is paid down, the mortgage is removed from the collateral pool securing the bond holders and is replaced by a yield bearing cash equivalent. Any variance in yield incurred is made up to the bond holders through increased periodic charges to all of the property owners.

The Entity 1 lends monies to the property owners 2–5 in the group to finance the purchases of the properties, using a bridge loan or other funds, secured by a mortgage or lien on each property, and a guarantee of a permanent lender or bond buyer/underwriter, then issuing the bonds or notes to repay the bridge funds after property acquisition is complete. The mortgages may be held by the Entity or alternatively placed in the custody of a third party to hold in trust 7 for the benefit of the instrument holders in case of default. If a property owner defaults in his or her payments, the Entity 1 adjusts the monthly payments of all other non-defaulting property owners in the group to make up this shortfall. Thus, the default of one or even several individual property owners may not trigger a default against the instrument holders.

The Entity 1 may contract with an administrative service unit 9 to calculate and collect the group's periodic payments which will generally be monthly, based on the monies needed for the Entity 1 to meet periodic obligations including those to the bond holders 6. Such obligations include: 1) any principal due on the Entity's bonds during any period 2) interest payable to bond holders 3) monies lost or gained due to prepayment or defaults; and 4) other expenses.

The Entity 1 may be a non-profit or for-profit corporation or a business organization in another form. Where the Entity 1 is owned by the property owners 2–5 and where periodic payments plus investment income are in excess of the Entity's requirements, dividends or other distributions to the Entity owners may be made.

In addition to real property, the present invention includes all other types of property or interest in such property which properties may include automobiles, inventories, accounts receivable, etc.

EXAMPLE I

A bond-issuing-entity ("Entity") lends twenty thousand dollars ($20,000) to each of a group often (10) property owners each having fee simple title in his or her house or home at a fixed or variable interest rate and takes back a mortgage from each property owner which mortgage agreement states that in case of a default of any of his or her obligations, his or her property can be sold to satisfy such default in whole or in part. Entity also obtains a loan agreement from each property owner in which the property owner promises to make monthly payments necessary for Entity to meet its obligations to honor the covenants of Entity's bond issues. In particular, each property owner loan agreement provides that to the extent there is any default in monthly payments by any of the ten (10) owners, Entity may increase monthly payments of the other non-defaulting property owners as necessary to meet or even exceed its current obligations to the bond holders. It is also stated in the loan agreements that prepayment by any property owner requiring Entity to invest such prepayment funds at a rate less than the pre-payer mortgager was paying, is a proper basis for further increasing monthly payments.

Entity then issues a series of twenty (20) ten thousand dollar ($10,000) bonds with staggered maturities from one (1) through twenty (20) years which bonds are backed by the credit of Entity plus the ten (10) cross-collateralized mortgage loan obligations of the property owners. The average maturity of ten years may be deliberately set to parallel the expected average holding period of a home in the Example market. A bond that matures before a sale or pay down that provides funds to satisfy that bond will be refinanced by Entity which will always endeavor to maintain a mix of maturities whose average approximates the average home holding period of the market.

Entity preferably hires an administrative service unit to invest such monthly payments and prepayments, if any, and to calculate and recalculate the monthly payments as they vary over the life of the property owner loans. Digital calculators or other calculating means are used to compute 1) each monthly interest payment due 2) monies lost or gained due to prepayment or defaults 3) other expenses and 4) principal payments, when and if, due.

EXAMPLE II

A development of three hundred (300) fifty thousand dollar ($50,000) homes is planned at an aggregate value of fifteen million dollars ($15,000,000). 300 homeowners are organized and form a corporation. The corporation obtains contracts for the delivery of 300 homes at a discount to retail of twenty percent (20%), i.e., forty thousand dollars ($40,000) each. All homeowner candidates agree to cross-collateralize one another's mortgage loan obligations and to subordinate such obligations and associated property to the corporation, enabling the corporation to offer to issue bonds against the collective pledges of the homeowners. A commitment is solicited and received from a bond underwriter to underwrite the bonds. Property development construction and ridge loans are obtained to develop the 300 homes. When the real estate is occupied, the bonds are issued for 90% of the appraised value of the homes or thirteen million five hundred thousand dollars ($13,500,000). Twelve million dollars ($12,000,000) are used to pay for the houses at $40,000 each, by retiring any bridge or construction lending. The balance of one million five hundred thousand, less underwriting expense of, for example two hundred thousand dollars ($200,000), is available as reserves and for investment in small businesses.

EXAMPLE III

The Entity of Example I or the corporation of Example II may (1) arrange for group property and casualty insurance where a credit insurance feature is included to cover excess default by individual homeowners (2) negotiate with public lending institutions, such as the World Bank or Small Business Administration, to leverage entity financing overages for use in further investment to stimulate economic activity (3) appeal to service organizations such as Rotary International foe small business mentors (4) manage and enforce payment collections and obligations of the individual homeowners.

EXAMPLE IV

The Entity and property owners of Example I or the corporation of Example II in which two or more such entities or corporations in geographically related or separated areas, including in different countries, are cross-collateralized with respect to the bonds issued by each and in which such bonds may be traded internationally.

EXAMPLE V

The Entity and property owners arrangement of Example V in which two or more such Entities in geographically separated areas the Entities bonds are cross-collateralized and in which the bonds are traded internationally.

EXAMPLE VI

Figure 2:
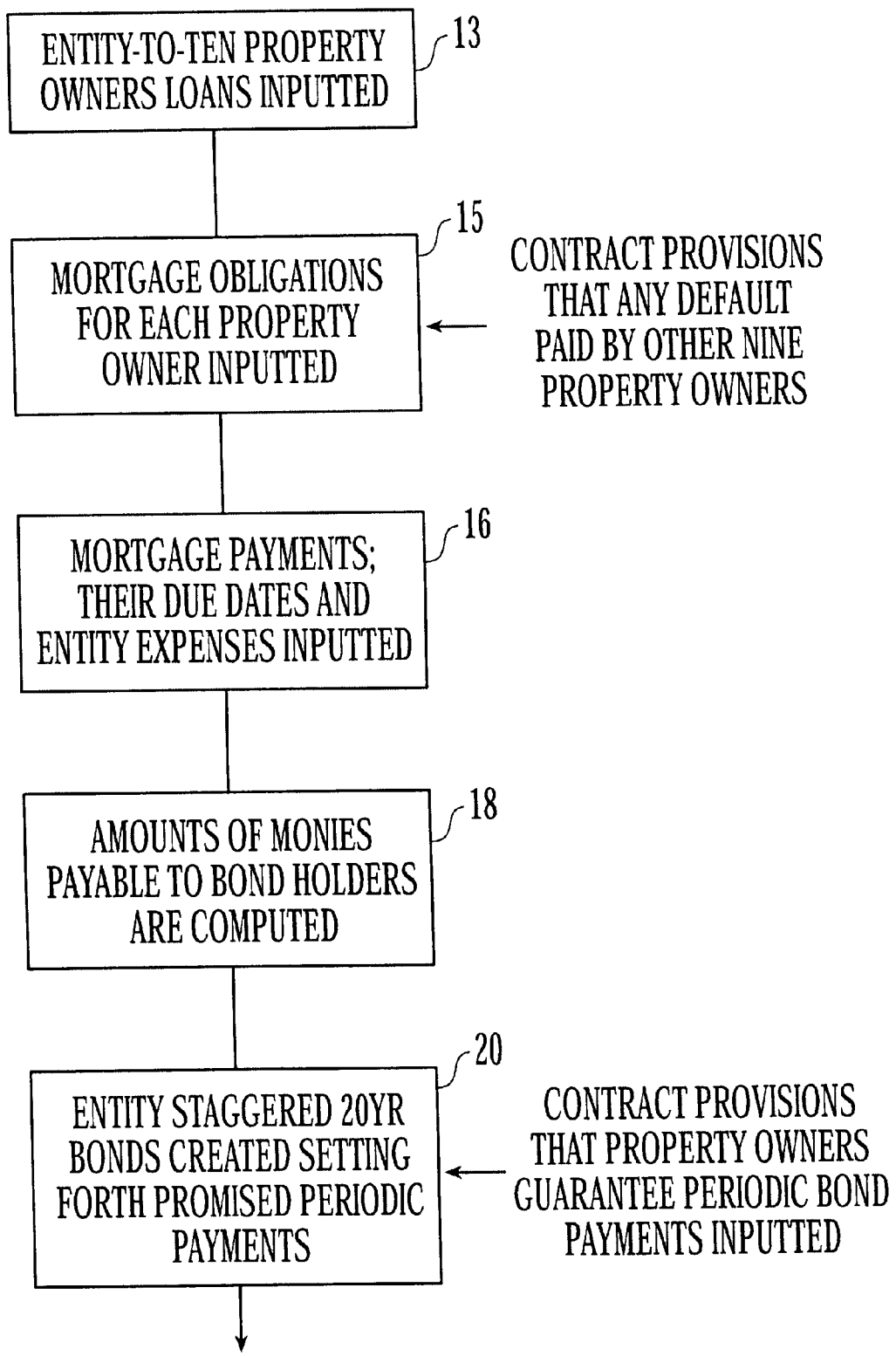
FIGS. 2 and 2A are flow charts.
Figure 2A:
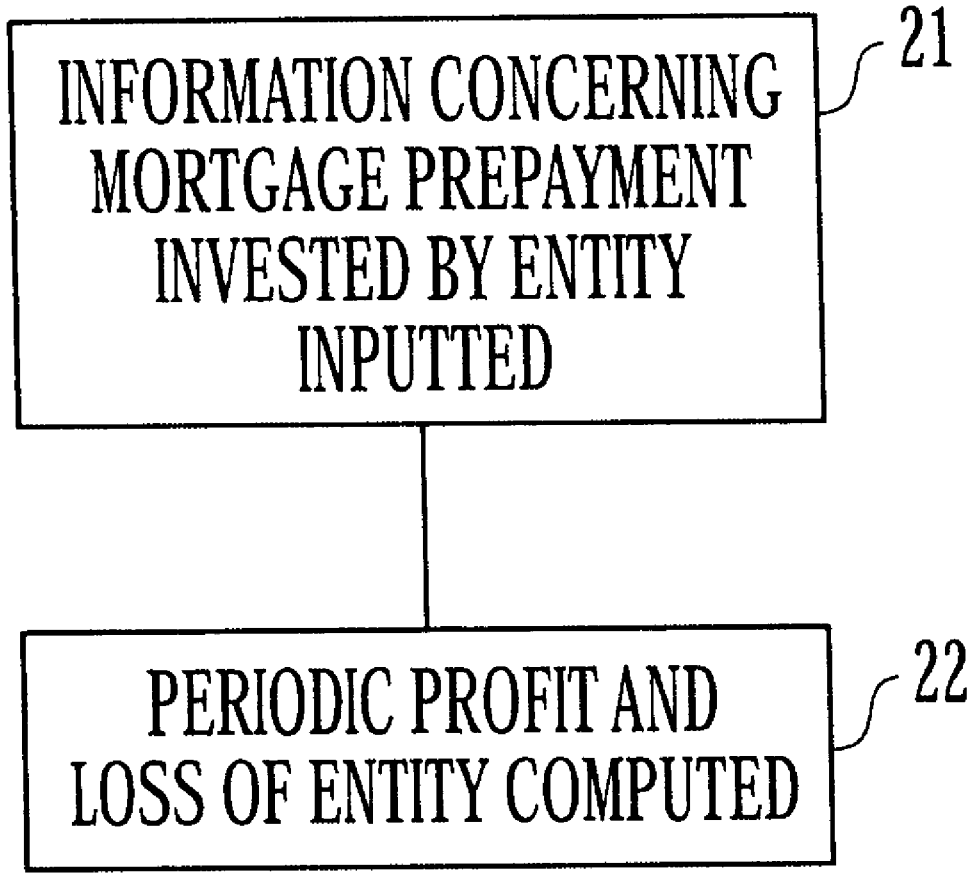

Example I is practiced by using a programmable computer. The computer is programmed to carry out the following steps and tasks as set out in the flow charge of FIGS. 2 and 2A. The computer performs the step 13 of inputting information for ten (10) property owner loans; the step 15 of inputting mortgage obligations including contract provisions. In step 16 payment due dates and expenses are inputted. In step 18, amounts of monies are computed and in step 20 bonds are created. In step 21 information and finally, profit and loss are computed in step 22.

Figure 3:
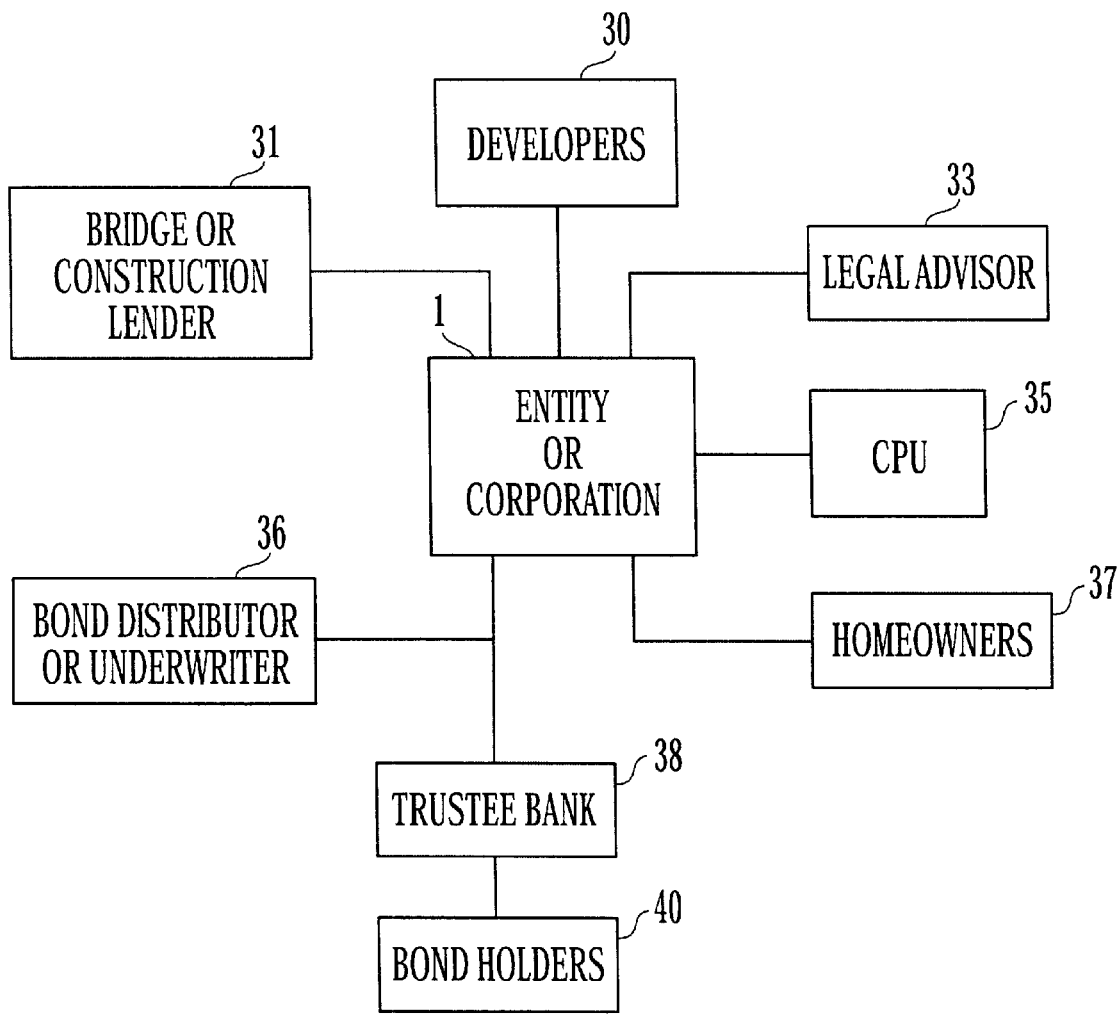
FIG. 3 is a flow charts.

The practice of the invention, the various individuals and organizations may be connected through a computer network such as the Internet. Through such a connection, information, money transfers, reports, legal contract provisions and other information for storage and processing is inputted to a central processing computer which serves the entity or corporation controlling the processes herein described, all as set out on FIG. 3. Entity 1 is connected to various individuals and organizations including developer 30, bridge (construction) lender 31, legal adviser 33, central processing unit (CPU) 35, underwriter 36, homeowner 37, trustee bank 38. The bond holders 40 are in communication with bank 38.

EXAMPLE VII

Example II is practiced using a programmable computer. Information and instructions are inputted into the computer for storage and processing and data is outputted to inform the corporation of the transactions as they occur; compile information and otherwise assist in the corporation's operations.

EXAMPLE VIII

The system of Example II in which the monies to buy the homes is raised by the Entity issuing bonds with varying maturities ranging from one (1) to fifteen (15) years. The average maturity is seven and one-half (7½) years which lies within the six to eight year range which range is the average period of time a U.S. homeowner holds a mortgage before he or she prepays the mortgage for reasons of sale of the home, change in interest rates or other reasons. Since three hundred (300) mortgages are involved an average or median prepayment rate can be expected. Because the bonds will become due each year, the corporation will experience roll-over costs incurred to put cash to work at the highest practical interest rates. Roll-over costs may be reduced by seeking financing in world debt markets made more efficient by the use of the Internet and World Wide web.

EXAMPLE IX

Figure 4:
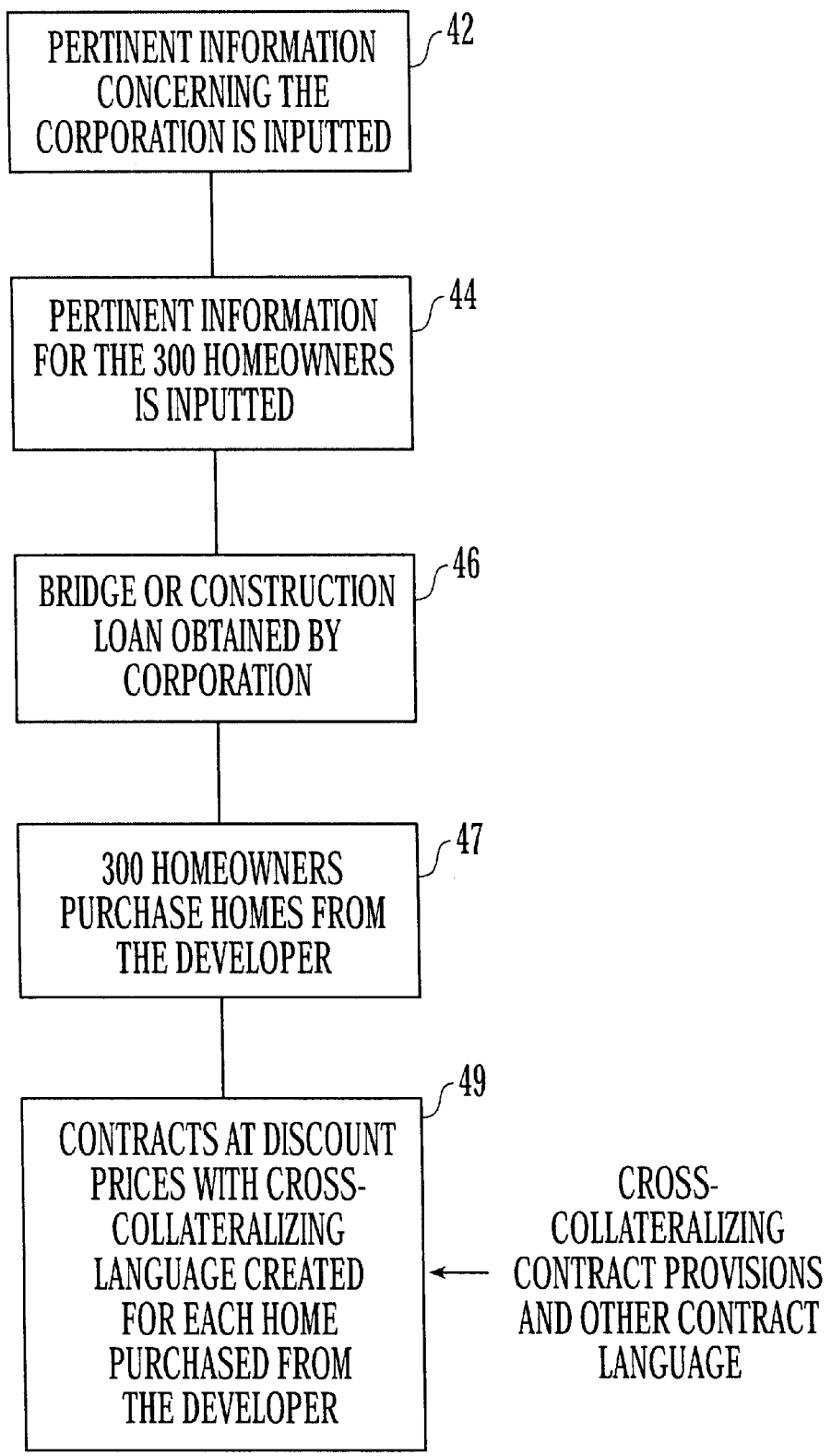
FIGS. 4 and 4A are a schematic of the interrelationship among individuals and entities.
Figure 4A:
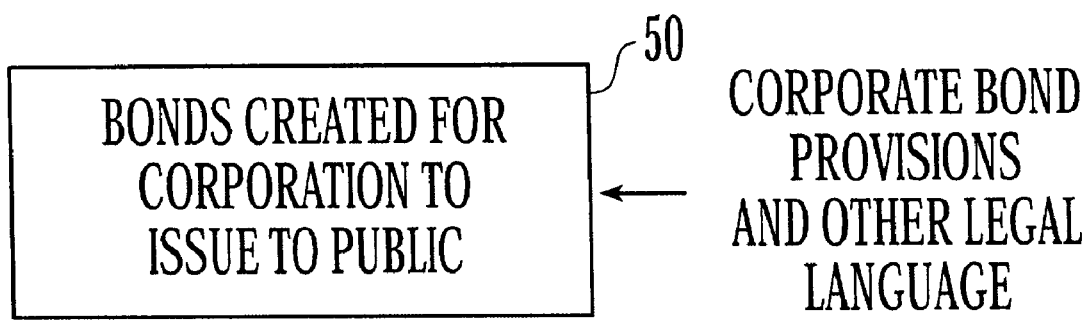

The computer is programmed to carry out the steps and tasks of Example II as set out on the flow chart of FIGS. 4 and 4A. Such steps and tasks include step 42 in which corporate information is inputted; step 44 in which homeowners information is inputted; step 46 in which a bridge loan is obtained by the corporation; step 47 in which homeowners purchase homes; step 49 in which collateralized contracts are created and finally, step 50 in which bonds are created for issuance.

EXAMPLE X

Figure 5:
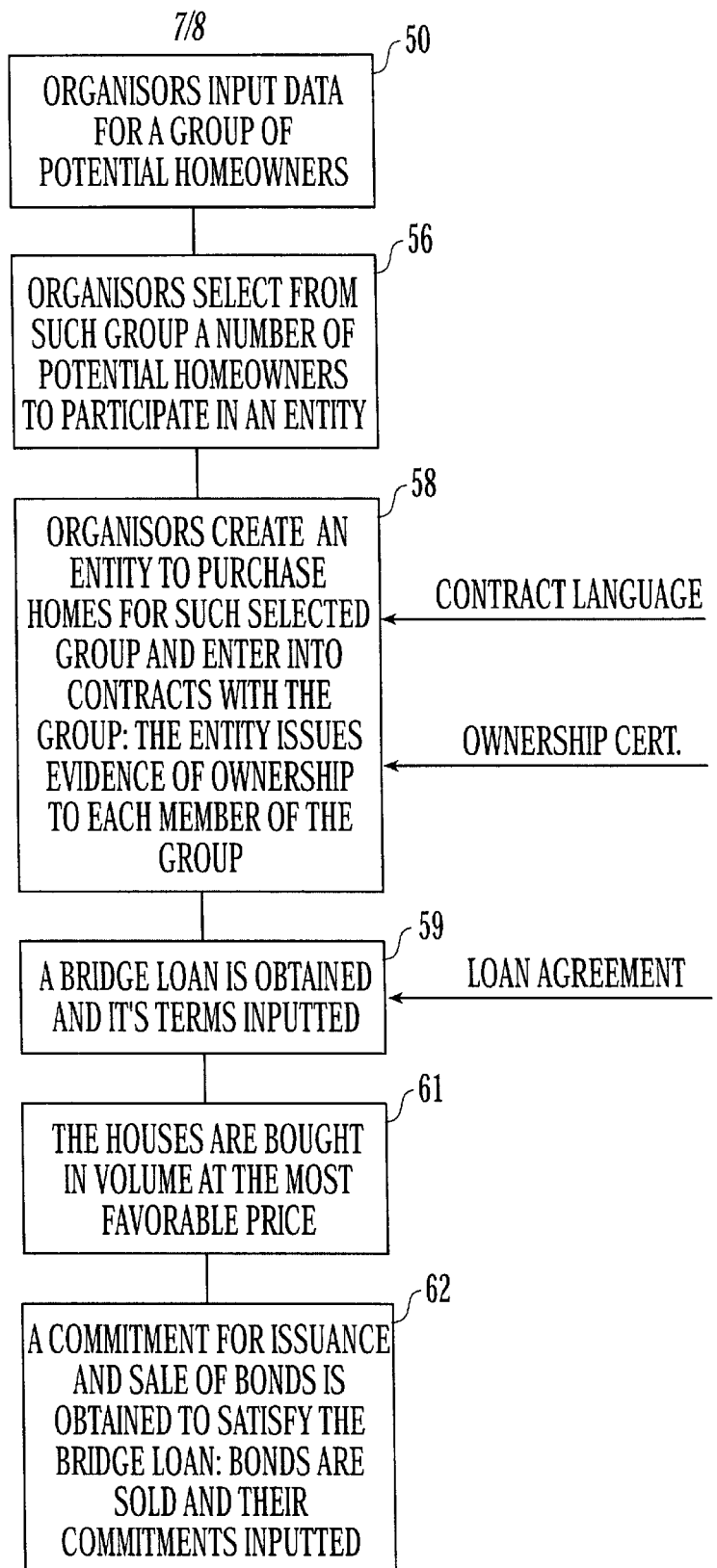
FIGS. 5 and 5A are a further flow sheet.
Figure 5A:
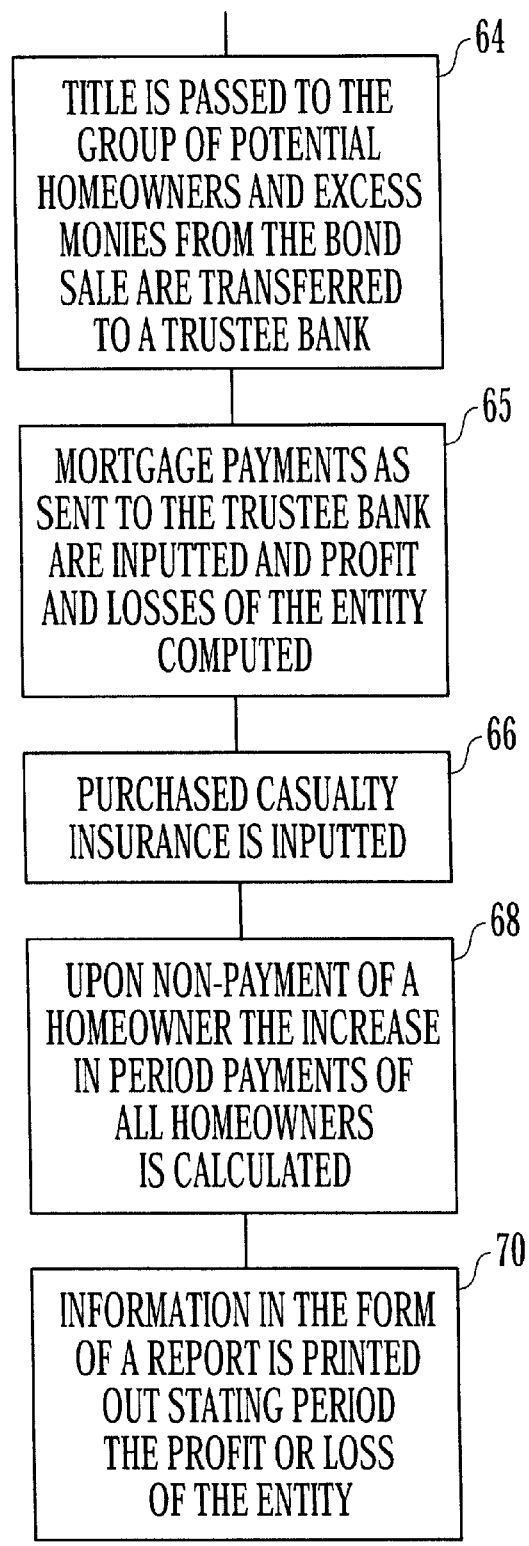

As a further example of the present system a computer is programmed to receive information and data and output data in the form of reports set out in flow diagrams of FIG. 5 and the organizational schematic of FIGS. 4 and 5A. In FIGS. 5 and 5A, listed are steps of inputting data (step 55), selecting potential buyers (step 56); creating an Entity 1 (step 58); obtaining a bridge loan (step 59); buying houses (step 61); commitment of issuance and sale of bonds (step 62); passing of house titles to homeowners (step 64); mortgage payments are thereafter sent to the trustee bank for computation (step 65); insurance is purchased (step 66); periodic homeowners payments are increased to cover homeowners not paying (step 68); and finally a report is issued by Entity 1 (step 70).

The proper operation of the present system of assisting a group to create an entity to purchase, finance and to provide service over a substantial and sustainable period of time requires leadership and pre-organization to initially obtain a group of prospective homeowners. The important second step is to screen the initial group through credit checks and other methods to obtain a final group of homeowners which are a peer lending group each member of which is qualified to purchase a home, agree to cross-collateralize; maintain their mortgage obligations and generally support the entity. Leadership to accomplish this selection process may come from the church, social organizations in the community or other sources.

The entity or corporation serving a group of homeowner or prospective homeowners may be created by or out of other community organizations such as church groups, fraternal orders, ethnic organizations, political parties or community social groups. The emotional bonds among members of such groups to enforce homeowners willingness to promise to pay when others are delinquent or default increases the likelihood of performance of such promise.

The corporation or entity carries out its functions as more particularly described in the above Examples. The corporation or entity may, in addition, invest in businesses including businesses that serve the community which includes the homeowners. It may also solicit professional help to assist such business and other businesses by obtaining donated services in the field of business administration, marketing, finance and law.

The benefits and obligations of the present system may be summarized by analyzing what happens when a potential homeowner commits to the entity or corporation. The following are the benefits and undertakings:

Benefits 1) the homeowner receives a lower interest rate mortgage;
2) the homeowner enjoys no or reduced down payment;
3) if the entity is a for profit corporation or entity, he or she may receive a stock ownership and dividends as paid;
4) the corporation or entity may buy back stock; and
5) a market maybe made in the stock providing liquidity.

Obligations 1) cross-collateralization agreement which is preferably limited to equity interest in the homeowners home;
2) cross-collateralization obligation may be limited by casualty insurance and obligations undertaken by related entities; and
3) the homeowner is subject to foreclosure for nonpayment of mortgage at end of agreed-to default period.

I claim:

1. A debt instrument issued by a financing entity and which debt instrument includes covenants by such entity, and which debt instrument is secured by property liens and loan agreements by a group of owners of properties which agreements permit
    a) foreclosure of such properties to satisfy covenants of such entity under such debt instrument; and
    b) which loan agreements require adjustable periodic payments from each and every property owner to such entity in the group which payments are adjusted by such entity as necessary to permit such entity to meet its covenants of the debt instrument.

2. The debt instrument of claim 1 in which such property liens are held by a third party custodian.

3. The debt instrument of claim 1 in which the properties are real properties.

4. The debt instrument of claim 3 in which the properties are held in fee simple by the property owner.

5. A method of creating a debt instrument comprising
    1) causing an entity to obtain collaterally guaranteed promises from each and every property owner in a group of properties, which promises jointly and severally obligate the owners to pay principal and interest with respect to debt instruments; and
    2) causing such entity to issue said debt instruments.

6. The method of claim 5 in which each property owner liability is limited to the value of the equity in his or her home.

7. The method of claim 5 having in addition the steps of creating a second entity and causing each entity to cross-collateralize each other entity promises obtained from its property owner.

8. The method of claim 5 in which the property owners are a community of members.

9. The method of claim 5 in which the entity purchases credit insurance to insure payments by the property owners.

10. A method of creating and selling marketable lien-backed debt instruments comprising
    a) creating a financing entity for lending monies to a plurality of property owners in a group for the purpose of financing a plurality of properties and thereafter causing such entity to
        i) lend money to such property owners;
        ii) obtain cross-collateralized lien and loan agreements from owners in the group promising to pay periodically his or her own and each and every other owners'
            a) interest due;
            b) cost to such entity arising from any mortgage prepayments; and
            c) other stated charges;
        iii) issue such instruments backed by such cross-collateralized lien and loan agreements; and
        iv) sell such instruments.

11. The method of claim 10 in which each property is a residence in a separate structure.

12. The method of claim 10 in which multiple residences are located in a single structure with each owner holding deed title to his or her resident.

13. The method of claim 10 in which the property owner's periodic payments require periodic adjustment by the financial entity which payments are determined by the steps of:
    i) determining the amounts and maturity dates of such bonds;
    ii) determining the amounts of interest due for such bonds and due dates;
    iii) determining other monies needed on specific dates;
    iv) inputting such determination into computing means including programmed calculating means; and
    v) operating the computing means to determine the amount and due dates of property owner periodic payments required to meet the financial needs of the financial entity.

14. The method of creating a community of homeowners comprising
    1) providing an entity which provides financing for such homeowners to assist in purchasing homes; and
    2) issue mortgages to such homeowners with collaterally guaranteed promise which jointly and severally obligate each homeowner up to the value of his or her home to pay principal and interest for each other homeowner in the community who receives such a mortgage.

15. The method of claim 14 in which the entity purchases houses in volume at a discount for resale to homeowners.

16. The method of claim 14 in which the entity obtains funds and invests such funds in income producing endeavors.

17. The method of claim 14 including the further step of causing the entity to purchase credit insurance to insure payments by the homeowners.

18. The method of claim 14 having the further step of causing the entity to issue notes and bonds of varying maturity.

19. The method of claim 18 in which the average maturity of notes and bonds is between 6 and 8 years.

20. A method of organizing a group of homeowners to purchase and finance such homes comprising providing leaders to obtain a group of potential homeowners;

creating an entity to purchase and finance homes for such group of potential homeowners;

causing the entity to obtain a bridge loan to purchase houses for such potential homeowners;

purchasing such houses from an owner and causing the owner to transfer title to each potential homeowner;

simultaneously causing the entity to obtain mortgages from such homeowners including cross-collateralization promises;

causing the entity to issue bonds with staggering maturities to pay off the bridge loan; and causing the entity to collect period payments from the homeowners which payments are adjusted to account for homeowners' arrears.

21. The method of claim 20 in which the title transferred is fee simple.

* * * * *